United States Patent [19]

Wirsbinski

[11] 4,417,765
[45] Nov. 29, 1983

[54] DUMP CART

[75] Inventor: James L. Wirsbinski, Marshfield, Wis.

[73] Assignee: J. I. Case Company, Racine, Wis.

[21] Appl. No.: 305,105

[22] Filed: Sep. 24, 1981

[51] Int. Cl.³ .............................................. B60P 1/28
[52] U.S. Cl. ..................... 298/5; 280/47.26; 280/63; 296/35.3; 296/184; 298/17 R; 298/20 R; 298/38
[58] Field of Search ............... 298/1 R, 2, 5, 6, 17 R, 298/17.5, 17.6, 19 R, 20 R, 38; 280/30, 47.26, 47.32, 63, 79.2; 296/35.1, 35.3, 184; 414/436, 482, 485

[56] References Cited

U.S. PATENT DOCUMENTS

| 2,172,154 | 9/1939 | Perin | 280/79.2 X |
|---|---|---|---|
| 2,361,592 | 10/1944 | Bjork | 280/47.32 X |
| 2,470,637 | 5/1949 | Olson | 298/19 R |
| 2,546,030 | 3/1951 | Grewe | 298/2 |
| 2,867,474 | 1/1959 | Linn | 298/38 X |
| 3,494,667 | 2/1970 | Schlapman et al. | 298/5 |
| 3,731,974 | 5/1973 | Stafford | 298/5 X |

FOREIGN PATENT DOCUMENTS 11683 of 1913 United Kingdom ................. 298/38

Primary Examiner—Leslie J. Paperner
Attorney, Agent, or Firm—Dressler, Goldsmith, Shore, Sutker & Milnamow, Ltd.

[57] ABSTRACT

A dump cart is disclosed having a box removably mounted on an axle support and pulled by a drawbar. A latch is mounted on the drawbar to coact with a latch catch on the side of the box. The latch is biased by biasing means such as a spring located within the drawbar where it is protected from damage. The box can have two mounting positions with respect to the drawbar permitting alternate use of the front and back sides for dumping.

5 Claims, 7 Drawing Figures

ID FILE

DUMP CART

TECHNICAL FIELD

This invention relates to dump carts and more particularly to dump carts used with lawn and garden tractors.

BACKGROUND OF THE INVENTION

Dump carts for use with lawn and garden tractors have been available to the the public for some time. Generally the dump cart is towed behind the tractor to carry such goods as dirt and tools from one part of the garden or lawn to another. Illustrative of such dump carts is U.S. Pat. No. 3,494,667 to Schlapman et al. These carts generally have a gox to carry the goods, a wheel set, an axle support and a drawbar to connect with the tractor to tow the cart. The box is mounted on an axle support which can pivot with respect to the wheels. Preventing this pivoting is a latch on the drawbar which engages with a latch catch on the box. Unfortunately their prior latches are relatively complicated and require several parts.

When the operator wishes to dump material out of the box, the latch is released and the box tips backward with most of the contents falling on the ground. Should the operator wish to completely empty the box, the tractor can be reversed to fully tip the cart. As the back edge of the box engages the ground, the dump cart is in effect turned upside down, emptying its contents on the ground.

However, this dumping process can damage the back edge of the box reducing its utility while the front end of the box remains substantially unscathed. Thus, it is possible to wear out a box on one side while another side remains essentially new.

The present invention obviates these problems by providing an uncomplicated latch mechanism. The present invention also allows the box to be reversed relative to the drawbar and wheels so that opposite sides of the box may be alternately used to engage the ground while the contents of the box are dumped out. This prolongs the useful life of the box as well as the dumping cart itself.

SUMMARY OF THE INVENTION

The dump cart of the present invention includes a body member or box removably mounted on an axle support. The box preferably has two mounting positions on the axle support approximately 180 degrees relative to each other. To facilitate mounting, the axle support is preferably provided with flanges which are slidably received in channels on the box. These two mounting positions increase the life of the dump cart by permitting it to be used until both the front and back sides have been severely damaged in use. A wheel set including an axle and spaced wheels is rotatably mounted on the axle support and a drawbar is rotatably mounted on the axle to permit the pulling and pushing of the cart.

Mounted on the drawbar adjacent one side, i.e., the front side of the box is a biased latch. This latch because of its uncomplicated and efficient design provides reliable service. Located on the front side of the box is a latch catch adapted to coact with the latch to releasably maintain the box in a fixed position, i.e. down, with respect to the drawbar. When the latch is disengaged, the box is permitted to tip backwards, dumping its contents on the ground. If desired, the tractor operator may then back up the tractor to completely dump the contents.

The box may also be provided with a second latch catch on the back side permitting the box to be reversed. After the back side of the box has become battered through extensive use, the box may be removed from the axle support and remounted approximately 180 degrees relative to its previous mounting. The second latch catch then coacting with the latch.

Numerous other advantages and features of the present invention will become readily apparent from the following detailed description of the invention, the accompany example and the appended claims.

DESCRIPTION OF THE PREFERRED EMBODIMENTS

Figure 1:
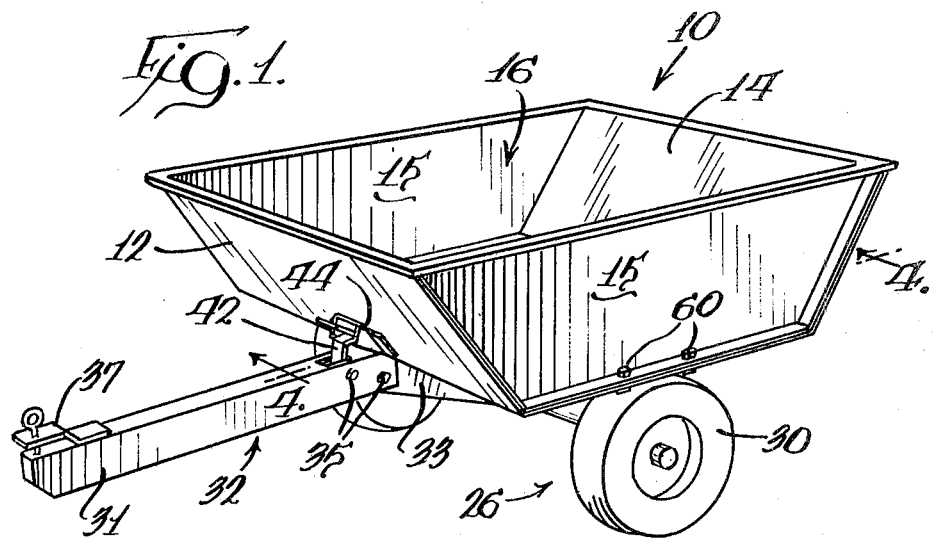
FIG. 1 is a perspective view of a dump cart embodying the present invention.

While this invention is susceptible of embodiment in many different forms, there is shown in the drawings and will be described in detail, one specific embodiment, with the understanding that the present disclosure is considered as an exemplification of the principles of the invention and is not intended to limit the invention to the embodiment illustrated.

The precise shapes and sizes of components described are not essential to the invention unless otherwise indicated. For ease of description, the dump cart of this invention will be described in a normal operating position and such terms as front, back, top, bottom, etc., will be used with reference to this position.

Figure 2:
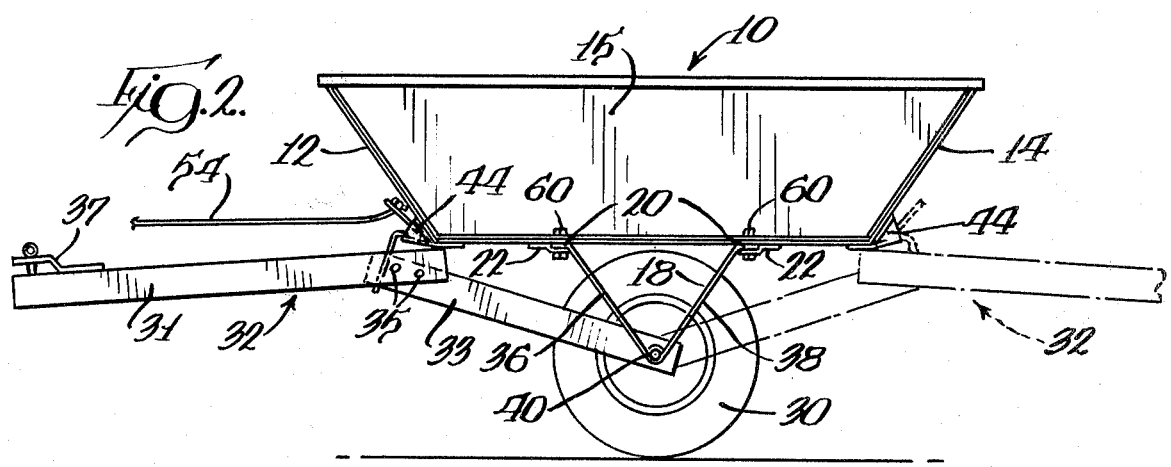
FIG. 2 is a side elevational view of the dump cart embodying the present invention with one wheel removed to permit viewing.
Figure 3:
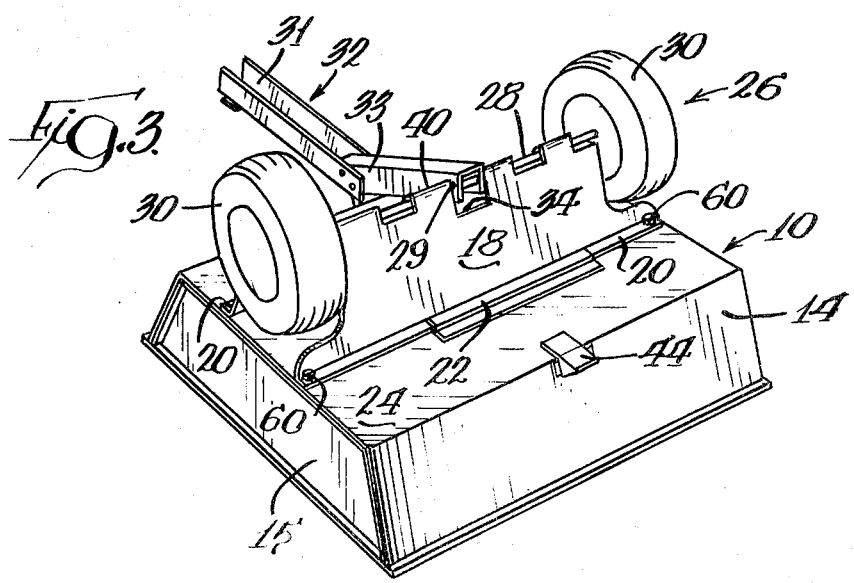
FIG. 3 is a bottom perspective view of the dump cart.

Referring to FIGS. 1–3, the dump cart of the present invention includes a body member or box 10 having a front 12, a back 14 and sides 15 defining a cargo space 16. The body member may be box 10, a flat bed or any other configuration used on carts. Means are provided for removably mounting the box 10 on a wheel assembly including wheels and an axle support 18 in one of the two mounting positions on the axle support approximately 180 degrees relative to each other. Preferably, the means for mounting includes flanges 20 fixed on the axle support which are slidably received into channels 22 fixed on the bottom 24 of the box 10 as the box is mounted on the axle support. The flanges 20 and channels 22 are substantially parallel to each other. The axle support also preferably has side members 36 and 38 having a generally "V" configuration extending from axle mount 40 to the flanges 20.

With this configuration of axle support 18 and box 10, the cargo space 16 is free of nuts and bolt heads which would interfere with the loading and unloading of material. This also reduces the available sites for rust to start. During shipping, the axle support 18 can be located within the box 10 permitting easy shipping. The new owner may then mount the axle support 18 on the box 10 and use fasteners 60 located on the outside edges of the box to retain the axle support 18 on the box.

The dump cart also includes a wheel set 26 including an axle 28 and spaced wheels 30 mounted on the axle support 18 with the axle substantially parallel to the flanges 20. The axle 28 may be rotatably mounted on the axle support 18 or may be fixed with respect to the axle support with the wheels 30 rotating on the axle. A drawbar 32, preferably a channel member having a bottom and sides, is provided with means for connecting the drawbar to permit pulling and pushing of the cart. This connecting means is preferably an aperture 29 in the drawbar 32 for rotatably mounting on the axle 28 between the wheels 30 within retaining chamber 34 of the axle support 18. It will be understood, however, that the drawbar 32 need not be mounted on the axle 28, but may instead be mounted on the axle support 18 or even removably mounted on the box 10.

As shown in the FIGURES, the drawbar 32 comprises a front half 31 and a back half 33 fixed together by bolts 35. This permits the proper angle of approach for hitch 37 mounted on the drawbar as the hitch is connected to a tractor. The front half 31 and back half 33 define a box channel area into which a latch and biasing means are safely located as discussed below.

Figure 4:
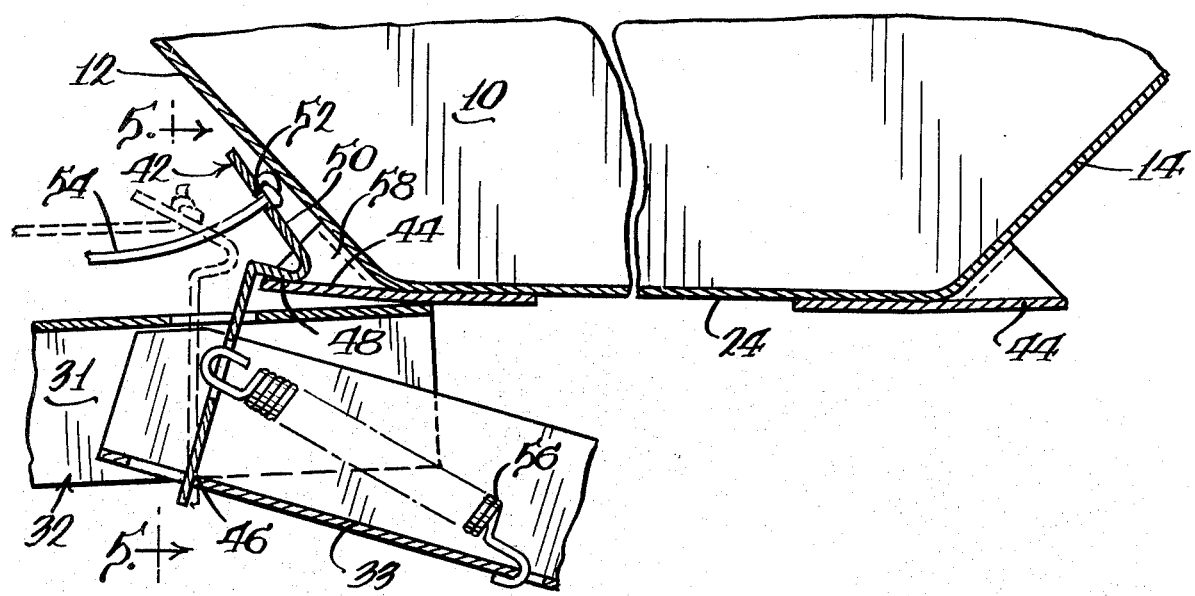
FIG. 4 is an enlarged, fragmentary cross-sectional view showing the latching mechanism of the present invention taken generally along plane 4—4 of FIG. 1.
Figure 5:
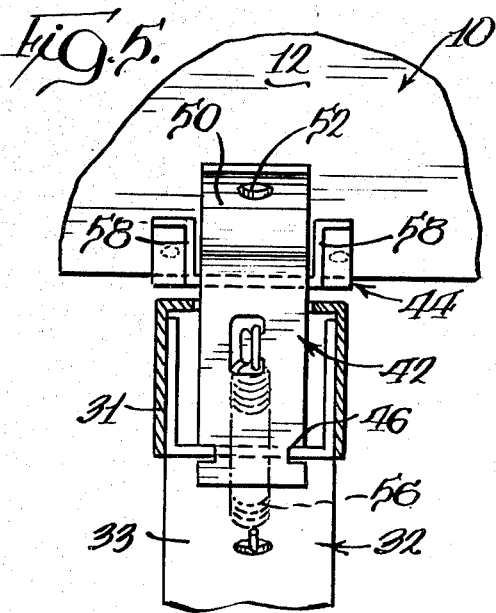
FIG. 5 is an enlarged, fragmentary front elevational view taken generally along plane 5—5 of FIG. 4 showing the latching mechanism of the present invention.

Referring to FIGS. 2, 4 and 5, mounted on the drawbar 32 adjacent the front 12 of the box 10 is a first latching means or latch 42. Mounted on the front 12 of the box 10 is a second latching means or latch catch 44. Alternatively, the box 10 is provided with two latch catches 44 mounted on the front and back sides. The latch catches 44 are adapted to coact with the latch 42 to releasably maintain the box 10 in a fixed position with respect to the drawbar 32, i.e. the down position. It will be understood, however, that the first and second latching means are interchangeable in that two latches may be mounted on the box with a latch catch mounted on the drawbar.

The latch 42 preferably is pivotably mounted at one end, a pivot end 46 on the bottom of the channel member defining the drawbar 32. The latch 42 then extends upward above the sides of drawbar 32. This protects the latch from damage. The other end of the latch includes an engagement surface 48 adapted to coact with and retain the latch catch 44. The latch 42 also includes a camming surface 50 to coact with the latch catch 44 to disengage the latch as the box 10 is moved toward the down position.

Thus, referring to FIG. 4, as the box 10 is tipped downward, latch catch 44 first contacts and coacts with the camming surface 50 to displace the latch 42 to the dotted outline shown in FIG. 4 allowing the box to be moved toward the down position as is shown in FIG. 4. The latch 42 then moves into the position shown in FIG. 4 to retain the box in the down position.

The latch 42 may also be provided with a hole 52 into which a rope 54 may be inserted allowing the operator to unlatch the box while remaining on the tractor. The latch 42 is preferably biased by a spring 56, but may also be biased by its natural resiliency provided that part, such as end 46 is fixed to the drawbar within the channel member 32. With this design, the latch biasing means, i.e. spring 56, is located within the box channel area of the drawbar 32 and is therefore protected against damage.

As can best be seen in FIGS. 4 and 5, the latch catches 44 are preferably also provided with guide members 58 on their sides. These guide members 58 coact with the sides of the 42 to align the latch catch as the box 10 is brought into the down position. This helps align the box 10 with the drawbar 32.

In operation, the axle support 18 is retained on the bottom 24 of the box 10 by a combination of the flanges 20, the channels 22 and fasteners 60 such as bolt and nuts. When the operator wishes to reverse the relative position of the body member 10 with respect to the drawbar 32, i.e., make the front side 12 the back side, the fasteners 60 are removed and the axle support 18 slid out of the channels 22, turned around and slid back into the channels and the fasteners 60 returned. Alternatively the drawbar 32 may be removed from the axle 28 and remounted in a reverse position. Either method will place the drawbar 32 in position with respect to the box 10 as shown by the dotted outline in FIG. 2. The latch 42 then coacts with the opposite latch catch 44 to releasably retain the body member in the fixed position.

Figure 6:
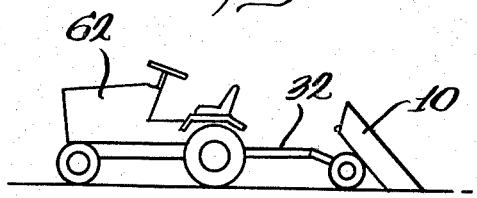
FIG. 6 is a side elevational view showing a tractor and the dump cart of the present invention in a dumping position.
Figure 7:
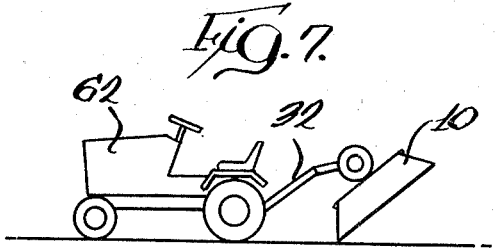
FIG. 7 is a side elevational view similar to FIG. 6 but showing the dump cart substantially upside down as the tractor is backed up.

When the operator wishes to dump the contents of the dump cart, the latch 42 is pulled forward such as by rope 54, the box is tipped and acquires the position as shown in FIG. 6. The tractor 62 can then be reversed, the edge of the back 14 engaging with the ground and pivoting to substantially turn the dump cart upside down as shown in FIG. 7.

The above-detailed description has been given for ease of understanding only. No unnecessary limitations are to be understood therefrom, as modifications will be obvious to those skilled in the art.

What is claimed is:

1. A dump cart suitable for use with a garden or lawn tractor comprising:
    (a) a wheel assembly;
    (b) a body member having a front, back, and sides defining a cargo space;
    (c) means for removably mounting the body member on the wheel assembly in one of two mounting positions approximately 180 degrees relative to each other;
    (d) a drawbar,
    (e) means for connecting the drawbar to the wheel assembly to permit pulling and pushing of the cart;
    (f) a first latching means mounted on the drawbar; and
    (g) two second latching means, each mounted on the front and back of the body member and adapted to coact with the first latch means to releasably maintain the body member in a fixed position with respect to the drawbar;
    whereby the body member may be mounted in either mounting position and one of the second latching means will coact with the first latching means to releasably maintain the body member in a first position with respect to the drawbar.

2. The dump cart of claim 1 wherein the first latching means is a biased latch and each second latching means is a latch catch.

3. The dump cart of claim 1 wherein the means for removably mounting the member on the wheel assembly includes spaced substantially parallel channels disposed on the body member and a pair of substantially parallel flanges disposed on the wheel assembly which are adapted to be slidably received in the channels permitting the body member to be mounted on the wheel assembly in two positions approximately 180 degrees relative to each other.

4. A dump cart suitable for use with a garden or lawn tractor comprising:
   (a) an axle support;
   (b) a pair of substantially parallel flanges disposed on the axle support;
   (c) a body member having a front, back, and sides defining a cargo space;
   (d) a pair of substantially parallel channels disposed on the body member, each channel substantially parallel to the front and back side, the body member being removably mounted on the axle support with the flanges received in the channels;
   (e) a wheel set including an axle and spaced wheels mounted on the axle support;
   (f) a drawbar rotatably mounted on the axle comprising a channel member having sides and a bottom;
   (g) a first latch catch mounted on the front of the body member;
   (h) a latch mounted on the drawbar with one end of the latch pivotably mounted on the bottom of the channel member and the latch extends above the sides of the channel member where the other end of the latch defines an engagement surface adapted to coact with and retain the latch catch and a camming surface to coact with the latch catch to disengage the latch as the body member is moved toward the fixed position; and
   (i) a second latch catch mounted on the back of the body member whereby the body member may be mounted on the axle support in one of two positions with one of the latch catches coacting with the latch.

5. A dump cart suitable for use with a garden or lawn tractor comprising:
   (a) an axle support;
   (b) a pair of substantially parallel flanges disposed on the axle support;
   (c) a body member having a front, back, and sides defining a cargo space;
   (d) a pair of substantially parallel channels disposed on the body member, each channel substantially parallel to the front and back side, the body member being removably mounted on the axle support with the flanges received in the channels;
   (e) a wheel set including an axle and spaced wheels mounted on the axle support;
   (f) a drawbar rotatably mounted on the axle;
   (g) a latch mounted on the drawbar;
   (h) a first latch catch mounted on the front of the body member, and adapted to coact with the latch to releasably maintain the body member in a fixed position with respect to the drawbar; and
   (i) a second latch catch mounted on the back of the body member whereby the body member may be mounted on the axle support in one of two positions with one of the latch catches coacting with the latch.

* * * * *